J. R. HUGHEY.
PEA HULLER.
APPLICATION FILED MAY 25, 1909.
955,403.
Patented Apr. 19, 1910.
3 SHEETS—SHEET 1.
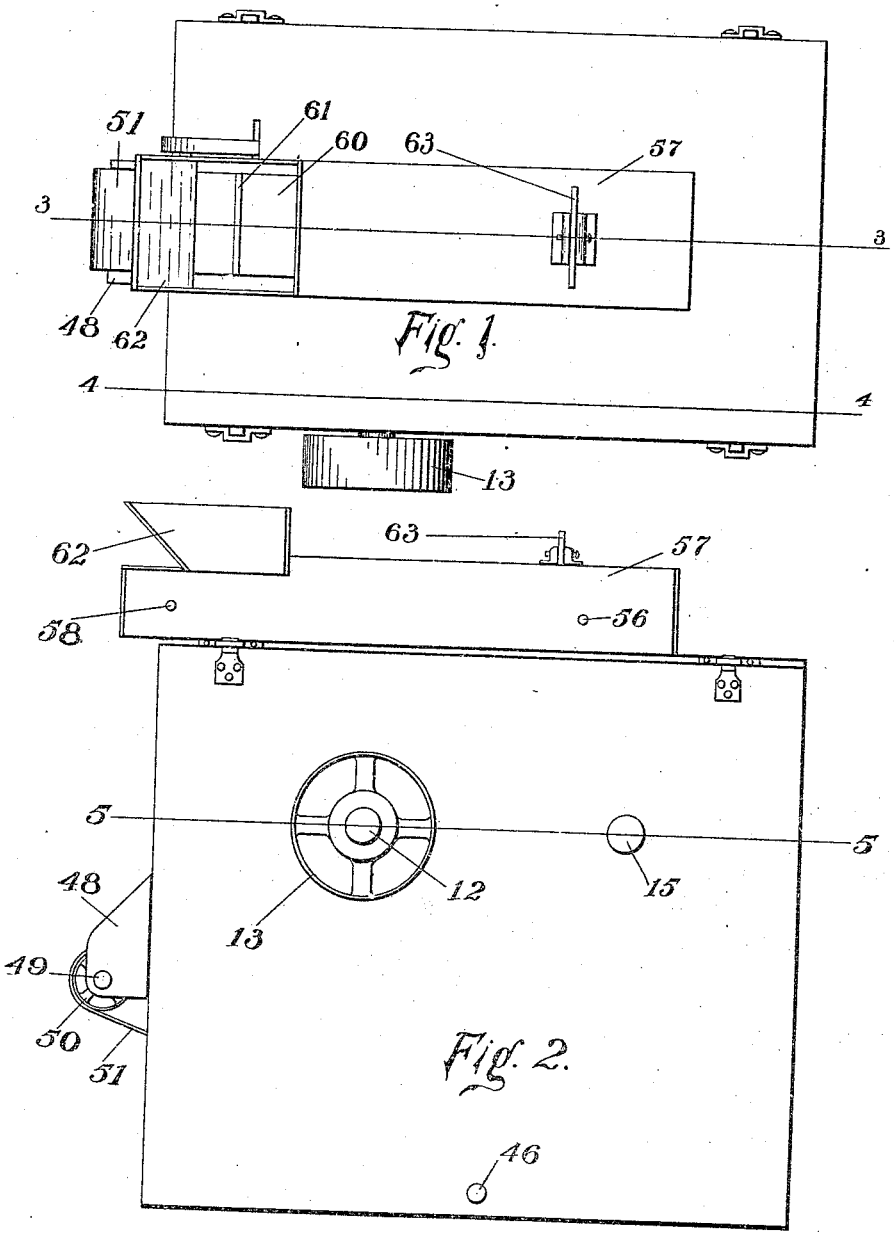

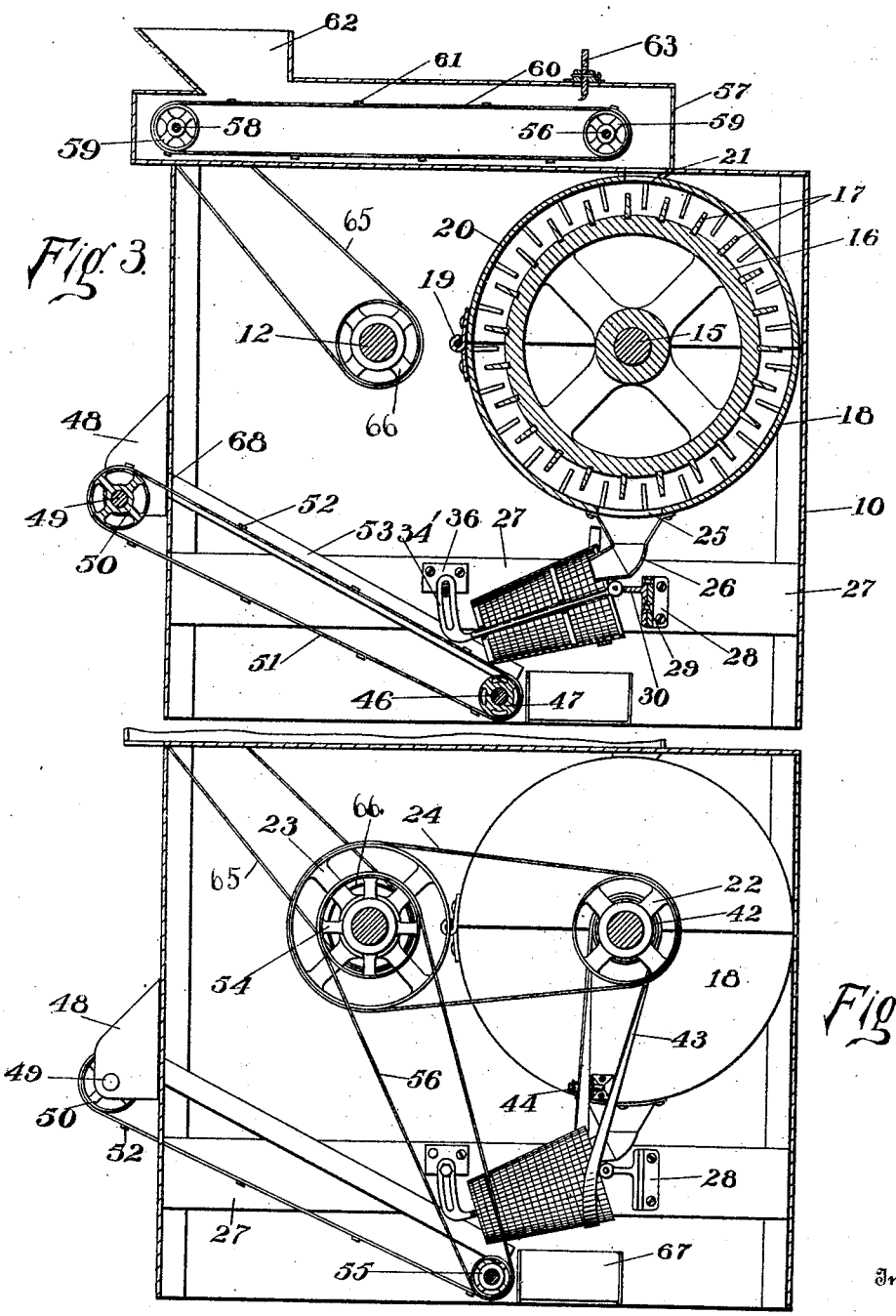

J. R. HUGHEY.
PEA HULLER.
APPLICATION FILED MAY 25, 1909.

955,403.

Patented Apr. 19, 1910.

3 SHEETS—SHEET 3.

Witnesses
J. S. Freeman.

James R. Hughey, Inventor

By Chandler & Chandler
Attorneys.

UNITED STATES PATENT OFFICE.

JAMES R. HUGHEY, OF JACKSON, GEORGIA.

PEA-HULLER.

955,403.  Specification of Letters Patent.  Patented Apr. 19, 1910.

Application filed May 25, 1909. Serial No. 498,196.

*To all whom it may concern:*

Be it known that I, JAMES R. HUGHEY, a citizen of the United States, residing at Jackson, in the county of Butts, State of Georgia, have invented certain new and useful Improvements in Pea-Hullers; and I do hereby declare the following to be a full, clear, and exact description of the invention, such as will enable others skilled in the art to which it appertains to make and use the same.

This invention relates to devices for separating peas and the like from their hulls and is preferably termed a pea huller.

One object of the invention is to provide an efficient pea huller which will remove the hulls from peas and the like and separate the same without the use of fans or blowers.

Another object of the invention is to provide a novel screen arrangement in pea hullers of this description.

With the above and other objects in view the invention consists in general of a casing wherein are mounted a suitable concave, a beater drum and an improved form of screen device.

The invention further consists in certain novel details of arrangement and combinations of parts hereinafter fully described, illustrated in the accompanying drawings, and specifically set forth in the claim.

Figure 5:
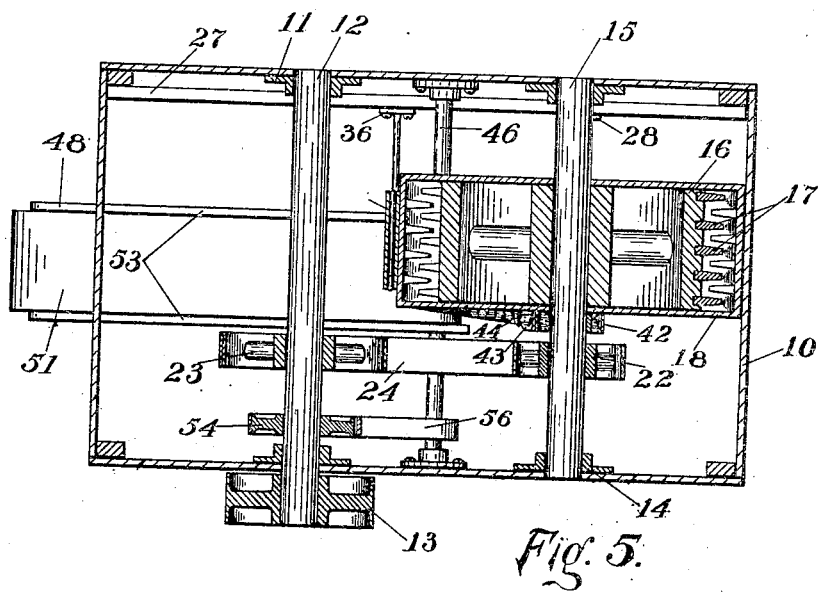
Figure 6:
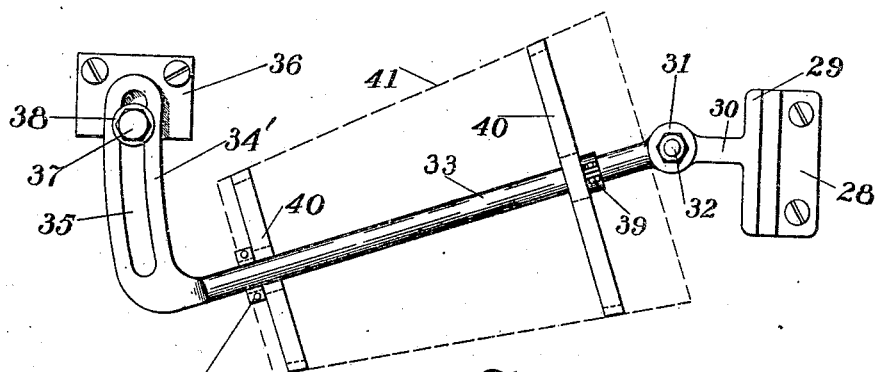

In the accompanying drawings, like characters of reference indicate like parts in the several views, and:—Figure 1 is a top plan view of a pea huller constructed in accordance with this invention. Fig. 2 is a side elevation thereof. Fig. 3 is a section on the line 3—3 of Fig. 1. Fig. 4 is a section on the line 4—4 of Fig. 1. Fig. 5 is a section horizontal on the line 5—5 of Fig. 2. Fig. 6 is an enlarged detail view showing the manner of supporting the separating screen.

The numeral 10 indicates the casing of this device and this may be of any desired size and shape to suit various requirements. Supported in suitable bearings 11 secured to the side wall of the casing 10 is a shaft 12 which is the main drive shaft of the huller. This shaft projects through the casing wall and has mounted thereon a driving means which is here indicated as a belt pulley 13 although it is obvious that this may be replaced in the smaller sizes by a crank. Mounted in bearings 14 is a shaft 15 upon which is supported a beater drum comprising a cylindrical portion 16 provided with suitable teeth 17. Surrounding the beater drum 16 is a concave including a lower member 18 to which is hinged as at 19 an upper member 20. This upper member 20 can thus be thrown back in order to obtain access to the inside of the drum and clear the same from hulls and the like. At the uppermost part of this member there is provided an opening 21 formed as a feed chute. A pulley 22 is mounted on the shaft 15 outside of the casing of the concave and a pulley 23 is mounted on the shaft 12 and is connected with the pulley 22 by means of a belt 24 so that as the shaft 12 is rotated the drum 16 will also be rotated. From the bottom of the member 18 and connected therewith by means of an opening 25 there extends a delivery chute 26 arranged to receive the hulls and peas after the hulls have been opened by the action of the beater drum and concave.

Mounted upon a suitable frame member 27 is a bracket 28, and supported on this bracket is a second bracket 29 provided with an arm 30 which has at its outer end a pair of opposed ears 31 provided with suitable perforations to receive a bolt 32. At 33 is a shaft which is provided with a perforated end 34 which lies between the ears 31 and through which passes the bolt 32. This shaft is thus free for pivotal movement about the bolt but is prevented from rotation. The shaft 33 is further provided at the opposite end with an upwardly extending arm 34' having an arcuate slot 35 formed therein, the center of the arc being the axis of the bolt 32. A bracket 36 is also supported on the member 27 and this bracket is provided with a suitable threaded opening adapted to receive a bolt 37 which passes through the slot 35 and on this bolt is engaged a washer 38 which bears against the face of the arm 34'. By means of this construction the free end of the shaft 33 may be adjusted to varying heights within the limit of the slots 35, it being simply necessary to loosen the bolt and place the nut in the desired position when the bolt may be again tightened to prevent movement of the shaft.

Upon the shaft 33 are mounted spaced collars 39 and between these collars are carried the spiders 40 of a frusto-conical screen 41 the lower element of which is normally inclined downward and this screen is so positioned that the mouth of the delivery chute 26 extends slightly therein. This screen is constructed of suitable perforated material and the perforations are of such size as to permit the passage of the peas or the like while they restrain the hulls from passing through the screen. Upon the shaft 15 is mounted a pulley 42 over which passes a belt 43 which extends around the screen to drive the same, being guided by a suitable idler 44.

Supported in suitable bearings 45 is a shaft 46 and this shaft lies just below the smaller end of the frusto-conical screen and has mounted thereon a drum 47. Upon the front wall of the casing are supported spaced brackets 48 which carry a shaft 49 having a drum 50 mounted thereon. Extending around the drums 50 and 47 is an elevator belt 51 provided with suitable slats 52 and upon each side of this elevator belt is a guide plate 53 which prevents material in its passage up the elevator from dropping over the sides. Upon the shaft 12 is mounted a pulley 54 and on the shaft 46 is a pulley 55 which is operatively connected to the pulley 54 by means of a belt 56. It is to be especially noted that the proportion of pulleys is such that no matter at what speed the shaft 12 may be driven the screen 41 will be driven at the same number of revolutions per minute while the drum 16 will be driven at twice the number of revolutions per minute of the shaft 12. Furthermore, when the lower end of the screen drum 41 is raised the belt 43 will become loosened, but as a belt on a cone pulley tends always to climb to the larger end of the cone and so takes up the slack, the belt 43 will move toward the larger end of the cone and the drum will be revolved at a decreased speed, being driven from a larger circumference. This speed arrangement forms a very important feature in the invention and it is necessary for the proper separation of the peas from the hulls that the beater drum should run twice as fast as the screen rotates. It is also found necessary that the conveyer belt 51 should travel at a considerably greater rate of speed than either the drum or screen.

Removably mounted on top of the casing 10 is a feeder which comprises a casing 57 wherein is mounted a pair of spaced shafts 58 carrying drums 59 over which passes a conveyer belt 60 provided with slats 61. The casing 57 is further provided with a feed hopper 62 located above one end of the belt at the front of the machine and adjacent this feed hopper is a gate 63 comprising a bar adjustable vertically to or from the belt and provided with a series of spaced downwardly extending fingers. Upon one of the shafts 58 is mounted a drive pulley (not shown) and a belt 65 connects this drive pulley with a drive pulley 66 on the shaft 12.

In the operation of the device the peas, in the condition in which they are picked from the vines, are deposited in the hopper 62 and the shaft 12 set in motion. This causes the unhulled peas to move along the feeder conveyer and be deposited in the concave where the hulls and peas are freed from each other by the action of the teeth on the feeder and concave. The mixed hulls and peas then pass downward through the delivery chute 26 into the screen 41. By means of properly adjusting this screen with the bolt 37 the peas and hulls are fed slowly down toward the conveyer belt 51. As the peas and hulls are rotated and shaken around in the screen the peas drop through the interstices of the screen and are received in a suitable box 67 which is arranged to be removed from the casing 10 at will. Meanwhile the hulls pass down through the open end of the screen and are deposited on the conveyer belt 51 and this conveyer carries them up through a suitable opening 68 and deposits them on the ground or in a receptacle placed outside of the casing.

By reason of the peculiar arrangement of speeds as well as the adjustability of the screen the separation is accomplished in an extremely thorough and efficient manner.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claim.

Having thus described the invention, what is claimed as new, is:—

In a pea huller, a concave, a beater drum mounted in the concave, a beater drum shaft carrying said beater drum, a pulley on said shaft, a downwardly inclined screen shaft pivoted at its upper end below said beater drum shaft, means to hold the lower end of said shaft in adjusted position, a frusto-conical screen on said shaft having its smaller end downward, means to drive said beater drum shaft, and a quarter turn belt running around said pulley and the screen, whereby as the lower end of the screen is raised the belt will be kept tight.

In testimony whereof, I affix my signature, in presence of two witnesses.

JAMES R. HUGHEY.

Witnesses:
J. E. SPRUCE,
T. P. BELL.